(12) United States Patent
Petit (10) Patent No.: US 11,717,016 B2
(45) Date of Patent: Aug. 8, 2023

(54) SUSHI MAKER KIT

(71) Applicant: Krom LTD LLC, New York, NY (US)

(72) Inventor: Arnaud Karim Petit, Brooklyn, NY (US)

(73) Assignee: Krom LTD LLC, New York, NY (US)

( * ) Notice: Subject to any disclaimer, the term of this patent is extended or adjusted under 35 U.S.C. 154(b) by 0 days.

(21) Appl. No.: 17/398,573

(22) Filed: Aug. 10, 2021

(65) Prior Publication Data

US 2023/0052096 A1 Feb. 16, 2023

(51) Int. Cl.
*A23P 20/20* (2016.01)
*A23L 17/60* (2016.01)
*A23L 7/196* (2016.01)

(52) U.S. Cl.
CPC ............. *A23P 20/20* (2016.08); *A23L 7/1965* (2016.08); *A23L 17/60* (2016.08); *A23V 2002/00* (2013.01)

(58) Field of Classification Search
None
See application file for complete search history.

(56) References Cited

U.S. PATENT DOCUMENTS 8,356,728 B2 * 1/2013 Moore ................. G02B 6/4261
49/260

FOREIGN PATENT DOCUMENTS

CN 201976694 U * 9/2011

OTHER PUBLICATIONS

SimpleLifeSU, Como preparar Sushi, Youtube.com, Published: Dec. 19, 2009. <https://www.youtube.com/watch?v=7T2ArxKiD2Q> (Year: 2009).*

* cited by examiner

*Primary Examiner* — Viren A Thakur
*Assistant Examiner* — Thanh H Nguyen
(74) *Attorney, Agent, or Firm* — Buckert Patent & Trademark Law Firm PC; John F. Buckert (57) ABSTRACT

A sushi maker kit having a frame member with first, second, third, fourth side walls and a ledge capturing portion is provided. The first, second, third and fourth side walls define an open region. The ledge capturing portion extends upwardly from the first, second, and third side walls proximate to a first end of the frame member. The sushi maker kit further includes an insert member having a plate portion and a keel portion. The keel portion is coupled to and extends from the plate portion in a first direction. The plate portion has a ledge portion at a first end thereof. The ledge portion is removably received in the ledge capturing portion such that the keel portion extends into the open region of the frame member when the insert member is in a first operational position relative to the frame member.

10 Claims, 12 Drawing Sheets

FIG. 33

SUSHI MAKER KIT

BACKGROUND

The popularity of making and eating sushi rolls at home is increasing. However, many individuals that try to make sushi rolls are inexperienced and cannot easily prepare the sushi rolls.

The inventor herein has recognized a need for an improved sushi maker kit that allows individuals to easily make sushi rolls.

SUMMARY

A sushi maker kit in accordance with an exemplary embodiment is provided. The sushi maker kit includes a frame member having first, second, third, fourth side walls and a ledge capturing portion. The first and second side walls extend parallel to one another. The third and fourth side walls extend parallel to one another and are coupled to and between the first and second side walls. The first, second, third and fourth side walls define an open region. The ledge capturing portion is coupled to and extends upwardly from the first, second, and third side walls proximate to a first end of the frame member. The sushi maker kit further includes an insert member having a plate portion and a keel portion. The keel portion is coupled to and extends from the plate portion in a first direction. The plate portion has a ledge portion at a first end thereof. The ledge portion is removably received in the ledge capturing portion such that the keel portion extends into the open region of the frame member when the insert member is in a first operational position relative to the frame member.

A method for making a sushi roll in accordance with another exemplary embodiment is provided. The method includes providing a sushi maker kit having a frame member and an insert member. The frame member has first, second, third, fourth side walls and a ledge capturing portion. The first and second side walls extend parallel to one another. The third and fourth side walls extend parallel to one another and are coupled to and between the first and second side walls. The first, second, third and fourth side walls define an open region. The ledge capturing portion is coupled to and extends upwardly from the first, second, and third side walls proximate to a first end of the frame member. The insert member has a plate portion and a keel portion. The keel portion is coupled to and extends from the plate portion in a first direction. The plate portion has a ledge portion at a first end thereof. The method further includes disposing a first portion of rice in the open region of the frame member. The method further includes disposing the insert member in a first operational position relative to the frame member such that the ledge portion is received in the ledge capturing portion and the keel portion extends into the open region of the frame member and forms a groove in the first portion of rice. The method further includes removing the insert member from the frame member. The method further includes disposing food ingredients into the groove formed in the first portion of rice. The method further includes disposing a second portion of rice on top of the food ingredients and the first portion of rice. The method further includes disposing the insert member in a second operational position relative to the frame member such that the ledge portion is received in the ledge capturing portion and the plate portion extends into the open region of the frame member to compress the first and second portions of rice and the food ingredients to form a compressed sushi portion. The method further includes removing the frame member and the insert member from the compressed sushi portion.

DETAILED DESCRIPTION

Figures 30, 31:
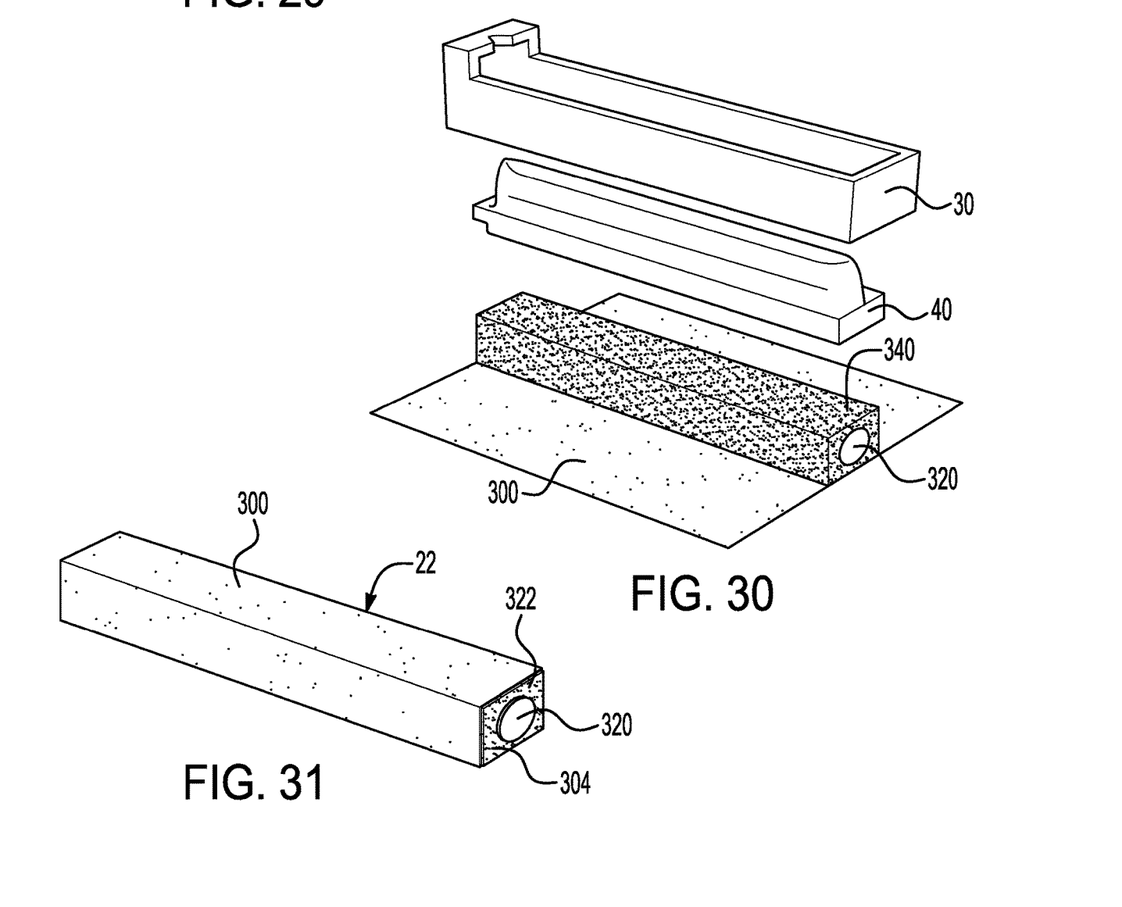
FIG. 30 is a schematic of the compressed sushi portion on a seaweed sheet with the insert member and the frame member removed from the compressed sushi portion.
FIG. 31 is a schematic of a sushi roll formed from the compressed sushi portion and the seaweed sheet.

Referring to FIGS. 1-19 and 31, a sushi maker kit 24 in accordance with an exemplary embodiment is provided. The sushi maker kit 24 allows a user to easily make a sushi roll 22 (shown in FIG. 31). The sushi maker kit 24 includes a frame member 30 and an insert member 40.

Figure 25:
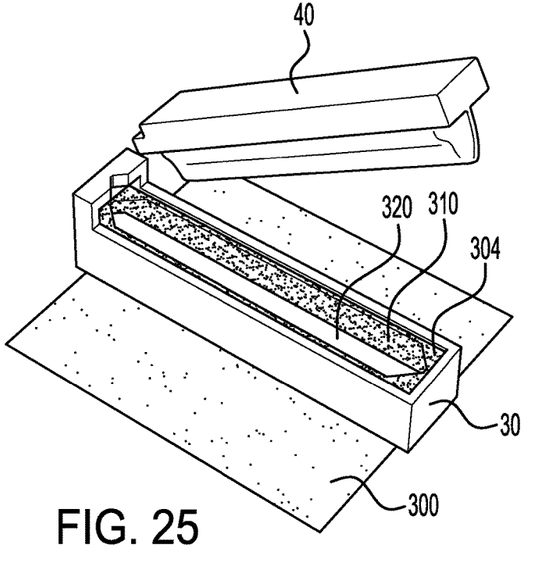
FIG. 25 is a schematic of the frame member, the insert member, and the first portion of rice having the groove therein that is partially filled with food ingredients.
Figure 26:
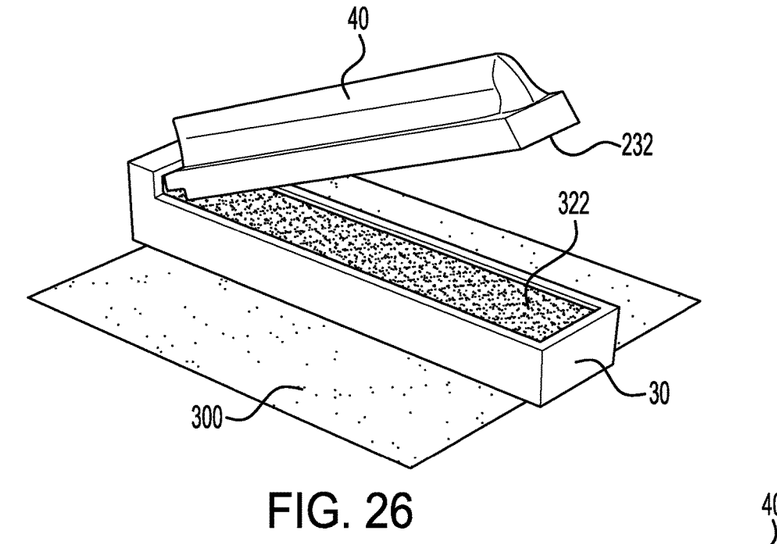
FIG. 26 is a schematic of the frame member, the insert member, and a second portion of rice that is disposed over the food ingredients.
Figure 27:
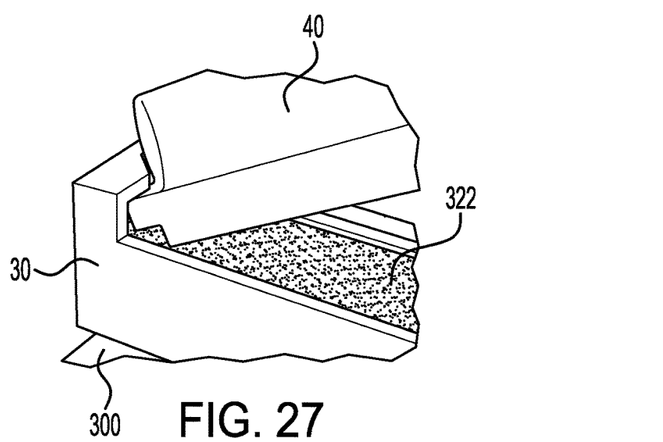
FIG. 27 is an enlarged schematic of a portion of the frame member and the insert member of FIG. 26.

An advantage of the sushi maker kit 24 is that the kit 24 utilizes the frame member 30 and the insert member 40 to compress rice and food ingredients within the frame member 30 for creating a uniformly shaped sushi roll 22. In particular, the frame member 30 has a ledge capturing portion 66 which is removably captures a ledge portion 230 of the insert member 40. In a first operational position (shown in FIG. 23), the ledge portion 230 is inserted within the ledge capturing portion 66 and the insert member 40 is rotated downwardly form a groove 310 (shown in FIG. 24) in a first portion of rice 304 disposed in the frame member 30. The groove 310 is sized and shaped to allow the user to easily dispose a correct amount of food ingredients 320 (shown in FIG. 25) therein. Further, in a second operational portion (shown in FIG. 26), the insert member 40 is flipped upside down and the ledge portion 230 is inserted within the ledge capturing portion 66 and the insert member 40 is rotated such that a flat top surface 232 compresses a second portion of rice 322 (shown in FIG. 25) over the first portion of rice 304 and the food ingredients 320 to form a compressed seaweed portion 340 (shown in FIG. 30).

Figures 20, 21:
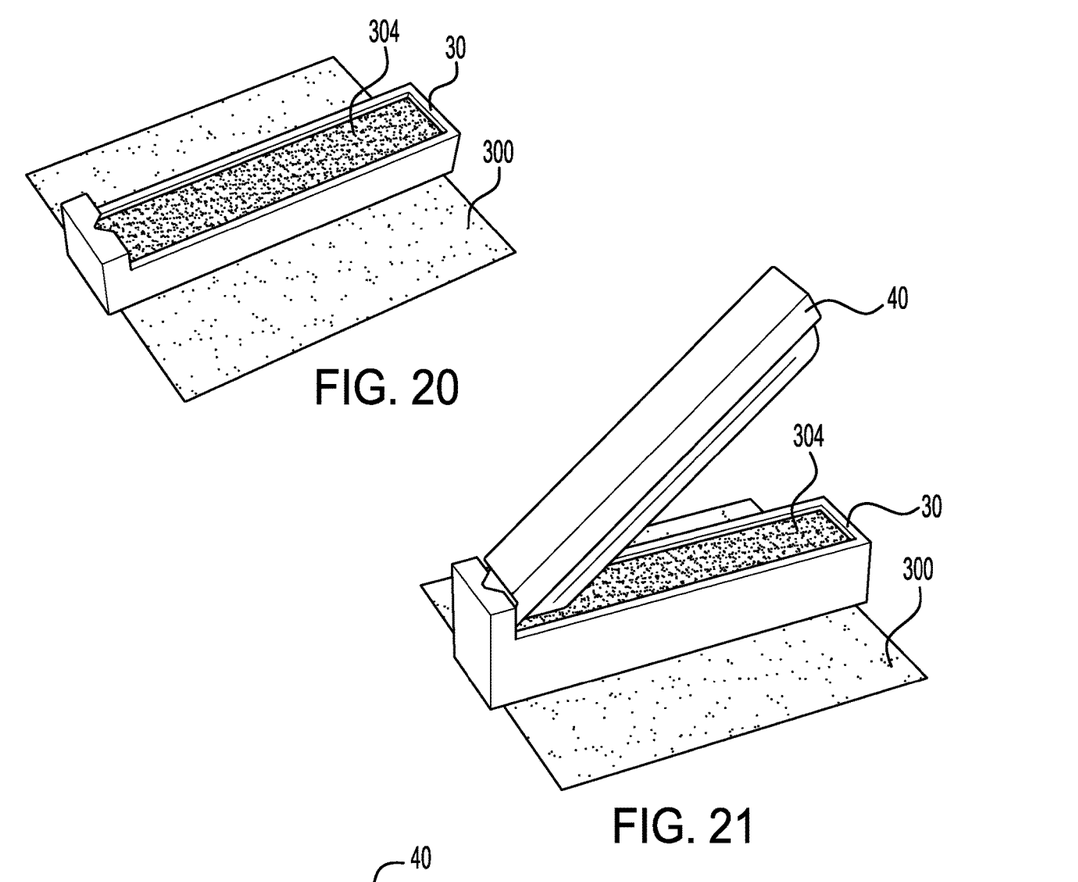
FIG. 20 is a schematic of the frame member disposed on the seaweed sheet having a first portion of rice therein.
FIG. 21 is a schematic of the frame member disposed on the seaweed sheet having the insert member being removably coupled to the frame member.
Figure 22:
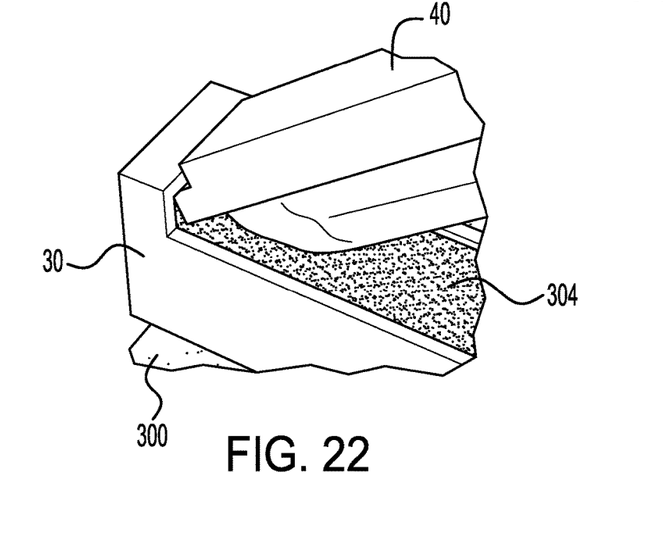
FIG. 22 is an enlarged schematic of a portion of the frame member and the insert member of FIG. 21.

Referring to FIGS. 1 and 4-11, the frame member 30 is provided to hold the first portion of rice 304 (shown in FIG. 20), the food ingredients 320 (shown in FIG. 25), and the second portion of rice 322 (shown in FIG. 26) therein. Further, the frame member 30 is sized and shaped to receive the insert member 40 therein. The frame member 30 includes first, second, third, fourth side walls 61, 62, 63, 64, a ledge capturing portion 66, a first end 81 (shown in FIG. 10), and a second end 82. The first and second side walls 61, 62 extend parallel to one another. The third and fourth side walls 63, 64 extend parallel to one another and are coupled to and between the first and second side walls 61, 62. Further, the third and fourth side wall 63, 64 extend perpendicular to the first and second side walls 61, 62. The first, second, third and fourth side walls 61, 62, 63, 64 define an open region 70 and a bottom surface 120.

Figure 1:
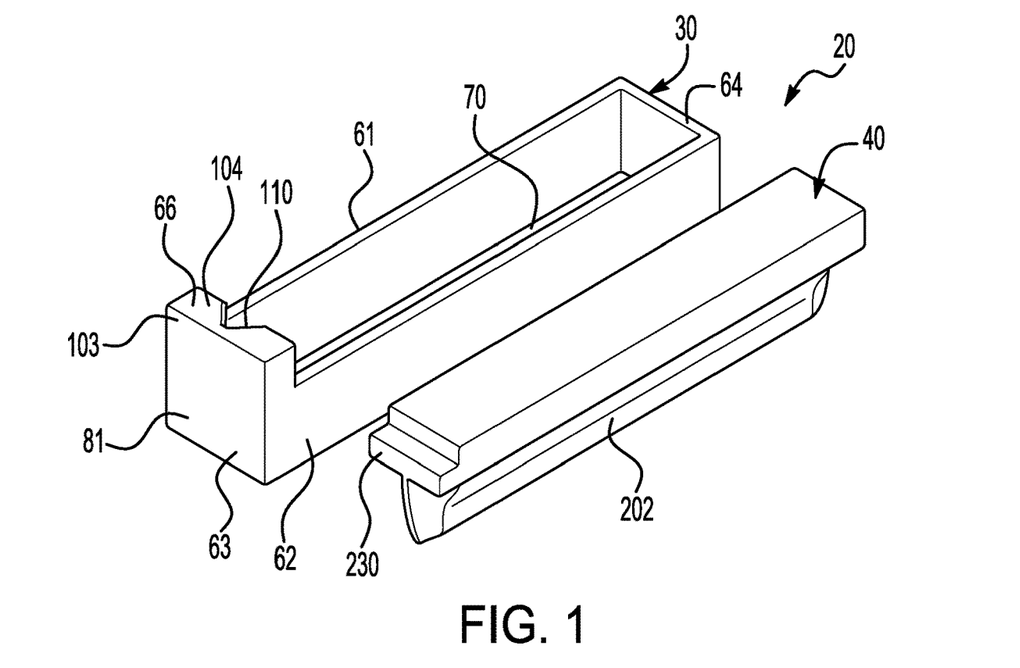
FIG. 1 is an isometric view of a sushi maker kit having a frame member and an insert member in accordance with an exemplary embodiment.
Figure 2:
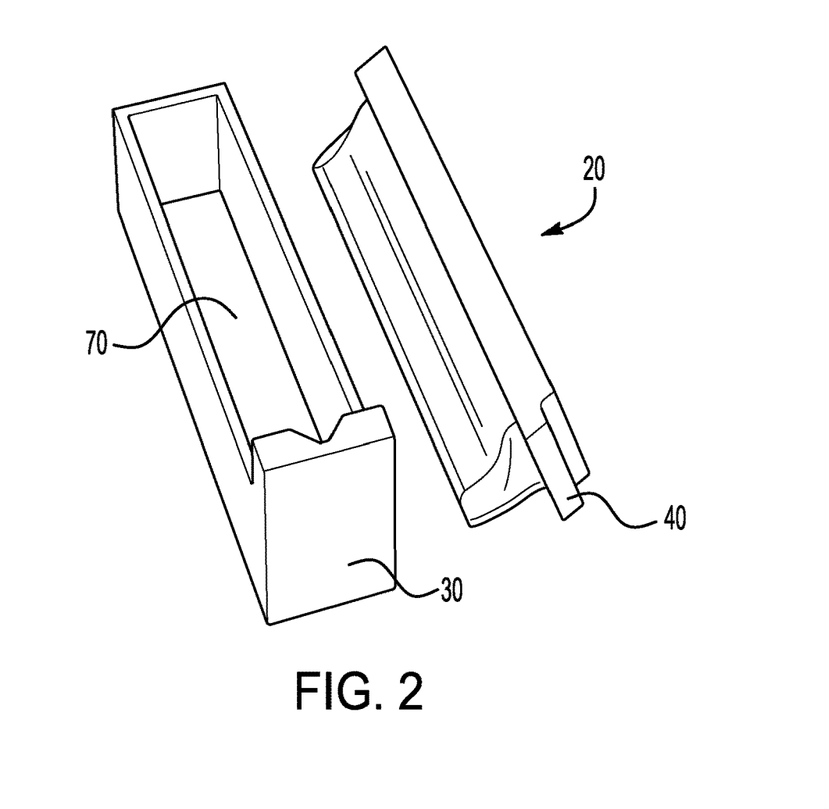
FIG. 2 is another isometric view of the sushi maker kit of FIG. 1.
Figure 3:
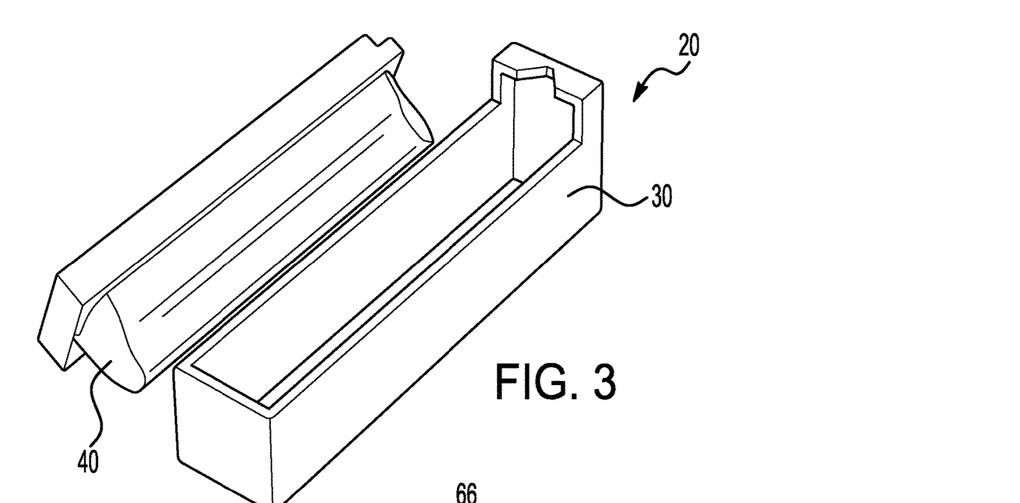
FIG. 3 is another isometric view of the sushi maker kit of FIG. 1.
Figure 8:
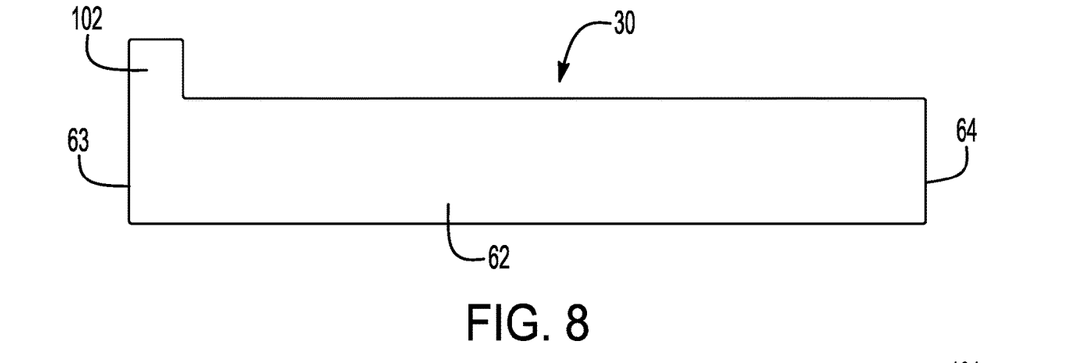
FIG. 8 is a first side view of the frame member of FIG. 4.
Figure 9:
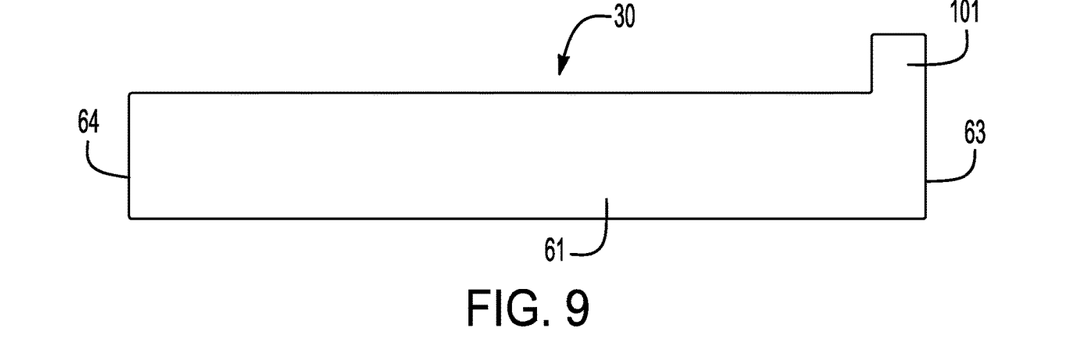
FIG. 9 is a second side view of the frame member of FIG. 4.
Figure 10:
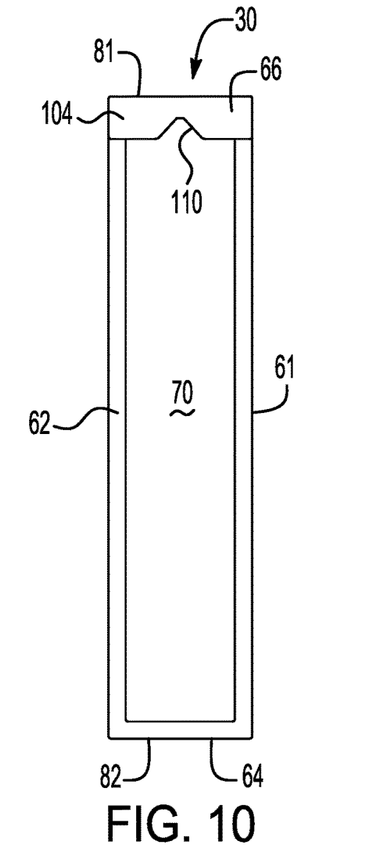
FIG. 10 is a top view of the frame member of FIG. 4.
Figure 11:
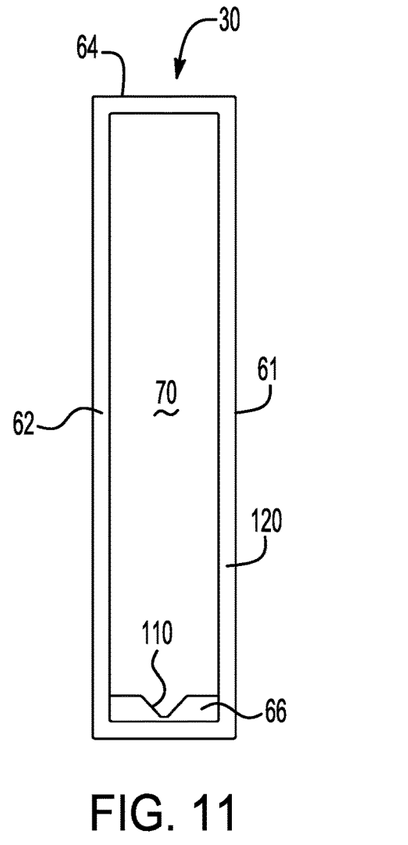
FIG. 11 is a bottom view of the frame member of FIG. 4.

Referring to FIGS. 1, 8 and 9, the ledge capturing portion 66 is provided to removably capture a ledge portion 230 of the insert member 40 therein and to thereafter allow the user to rotate the insert member 40 downwardly into the open region 70. The ledge capturing portion 66 is coupled to and extends upwardly from the first, second, and third side walls 61, 62, 63 proximate to a first end 81 of the frame member 30. The ledge capturing portion 66 includes first, second, third and fourth wall portions 101, 102, 103, 104.

Referring to FIG. 9, the first wall portion 101 is coupled to and extends upwardly from the first side wall 61.

Referring to FIG. 8, the second wall portion 102 is coupled to and extends upwardly from the second side wall 62.

Referring to FIG. 1, the third wall portion 103 is coupled to and extends upwardly from the third side wall 63.

Figures 4, 5:
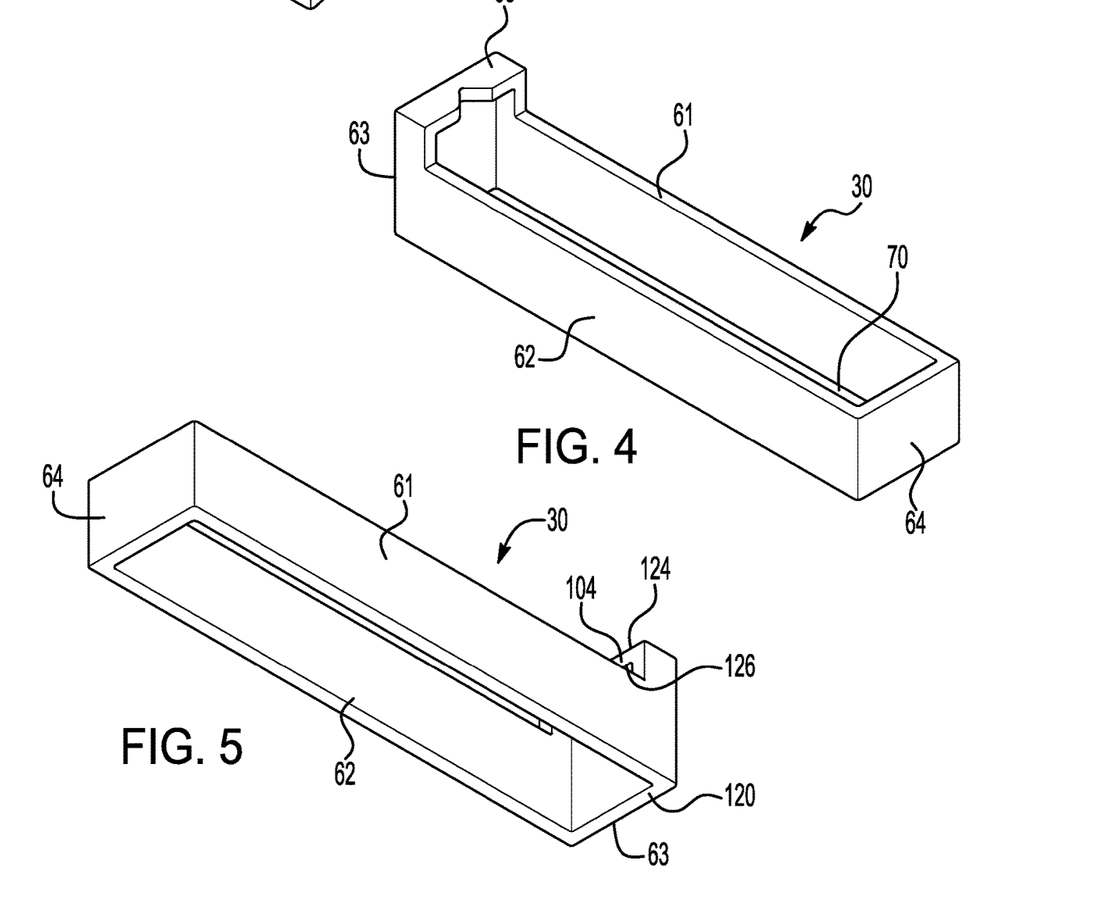
FIG. 4 is an isometric view of the frame member of FIG. 1.
FIG. 5 is another isometric view of the frame member of FIG. 4.
Figure 6:
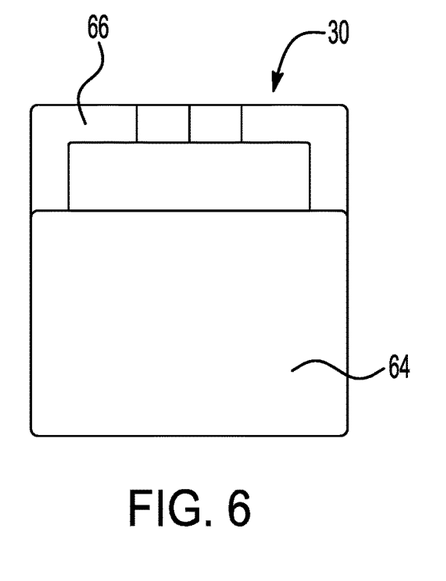
FIG. 6 is a rear view of the frame member of FIG. 4.
Figure 7:
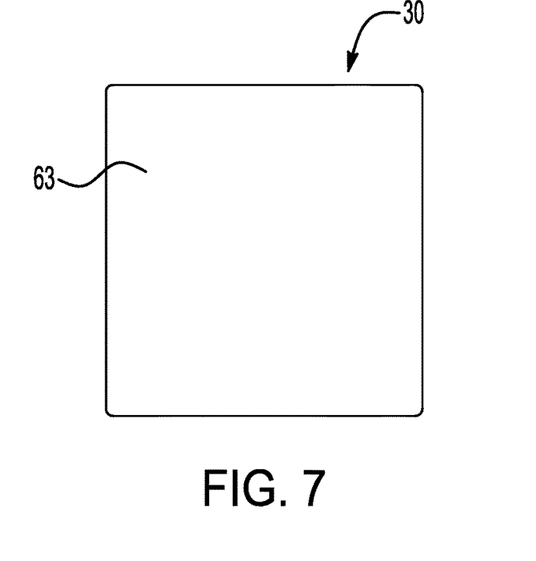
FIG. 7 is a front view of the frame member of FIG. 4.
Figure 28:
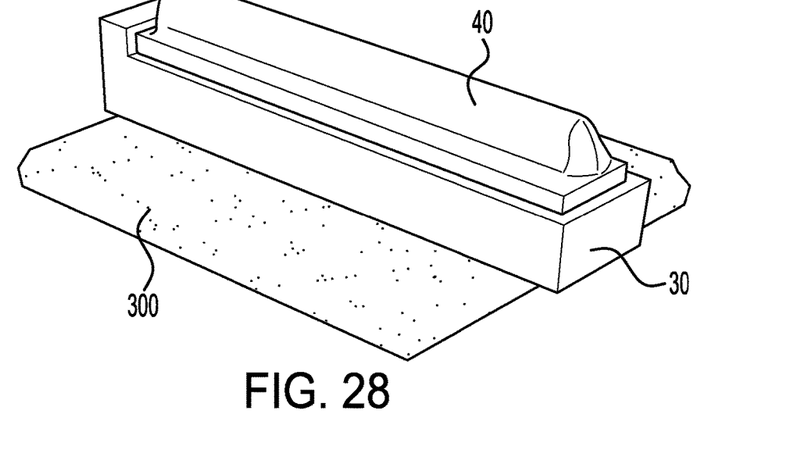
FIG. 28 is a schematic of the frame member disposed on the seaweed sheet with the insert member being at a second operational position relative to the frame member for compressing the first portion of rice, the food ingredients, and the second portion of rice to obtain a compressed sushi portion.

The fourth wall portion 104 is coupled to first, second, and third wall portions 101, 102, 103 and extends toward the fourth side wall 64. The fourth wall portion 104 has a groove 110 (shown in FIGS. 10 and 11) extending therein that is sized and shaped to receive a first tip portion 271 (shown in FIG. 13) of the keel portion 202 of the insert member 40 therethrough when the insert member 40 is in a second operational position (shown in FIG. 28) relative to the frame member 30. Referring to FIG. 5, the fourth wall portion 104 further includes a top surface 124 and a bottom surface 126. A vertical distance from the bottom surface 126 of the fourth wall portion 104 to a bottom surface 120 of the third side wall 63 is greater than a vertical thickness of the insert member 40.

Figure 12:
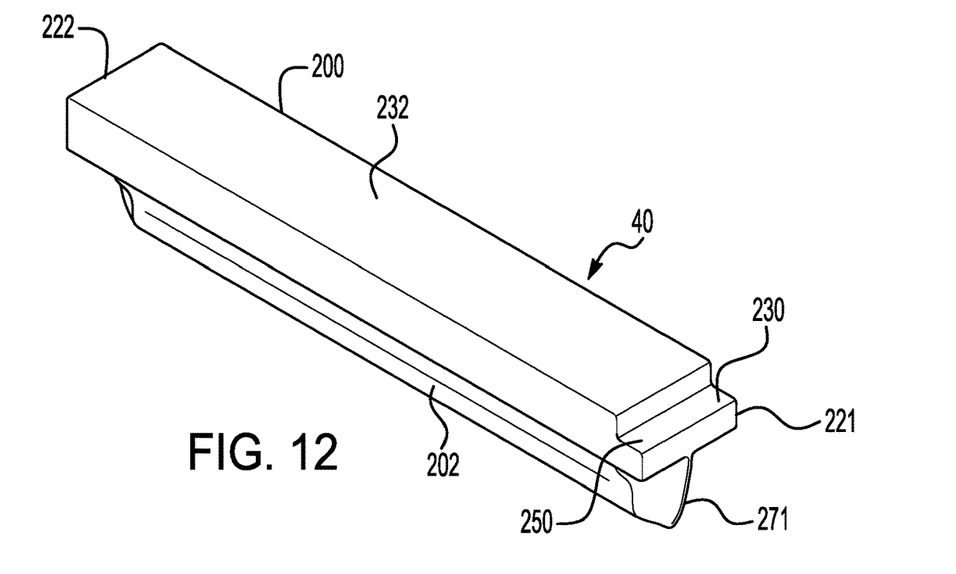
FIG. 12 is an isometric view of the insert member of FIG. 1.
Figure 24:
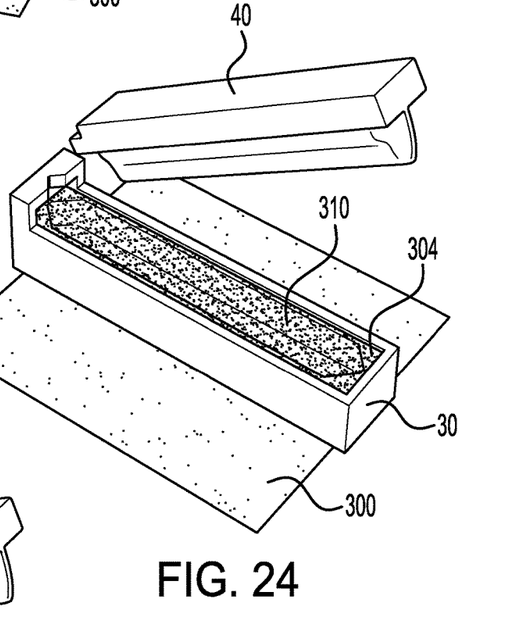
FIG. 24 is a schematic of the frame member, the insert member being removed from the frame member, and the first portion of rice having the groove formed therein.

Referring to FIGS. 1 12, and 24, the insert member 40 is provided to form a groove 310 in a first portion of rice 304 in the frame member 30. The insert member 40 is further provided to compress the first portion of rice 304, food ingredients 320 (shown in FIG. 25), and a second portion of rice 322 (shown in FIG. 26) in the frame member 30. The insert member 40 includes a plate portion 200 and a keel portion 202.

Referring to FIGS. 12-18, the plate portion 200 has a first end 221, a second end 222, a ledge portion 230, a flat top surface 232, and a bottom surface 234. A groove 240 (shown in FIG. 13) extends from the flat top surface 232 into the plate portion 200 and defines a top surface 250 (shown in FIG. 12) of the ledge portion 230. The ledge portion 230 is disposed at the first end 221 of the plate portion 200.

Referring to FIGS. 13-16, the keel portion 202 is coupled to and extends from the bottom surface 234 of the plate portion 200 in a first direction. The keel portion 202 includes a first tip portion 271, a second tip portion 272, and a central portion 273. The central portion 273 is coupled to and extends between the first tip portion 271 and the second tip portion 272. In an exemplary embodiment, a longitudinal length of the keel portion 202 is equal to a longitudinal length of the plate portion 200. Further, a vertical height of the keel portion 202 is greater than a vertical height of the plate portion 200.

Figures 13, 14:
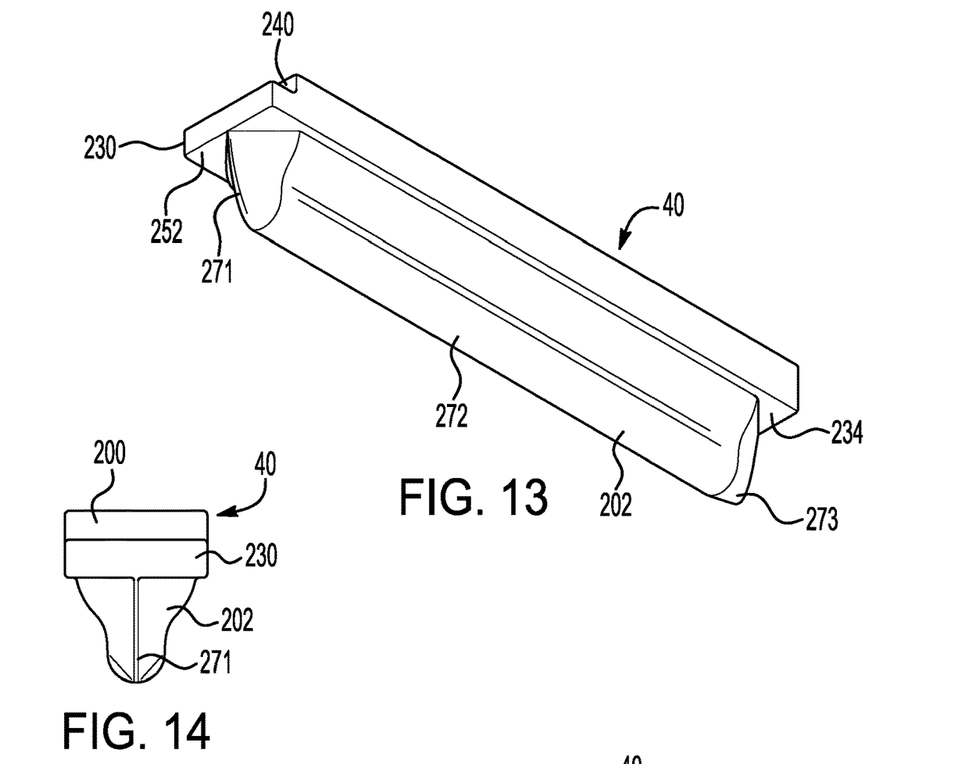
FIG. 13 is another isometric view of the insert member of FIG. 12.
FIG. 14 is a front view of the insert member of FIG. 12.
Figure 15:
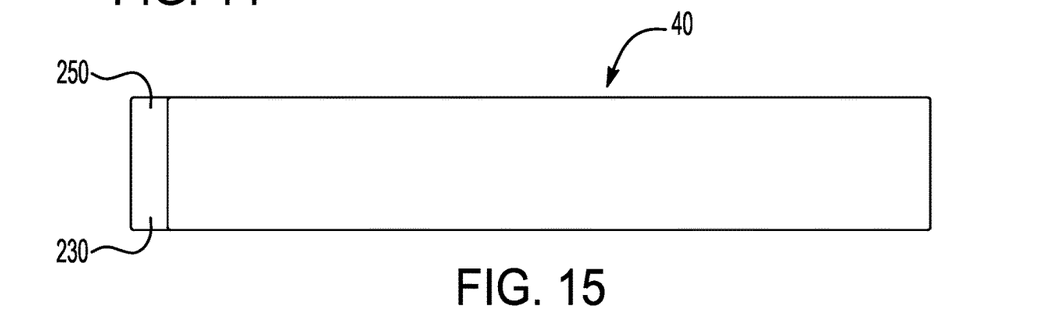
FIG. 15 is a top view of the insert member of FIG. 12.
Figure 16:
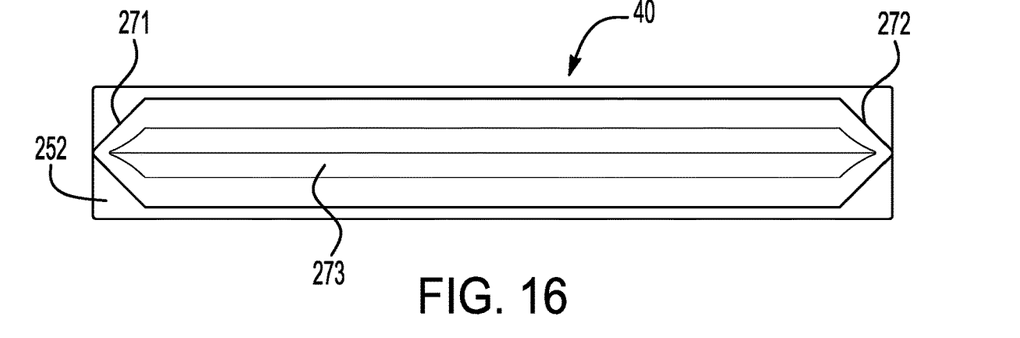
FIG. 16 is a bottom view of the insert member of FIG. 12.
Figure 17:
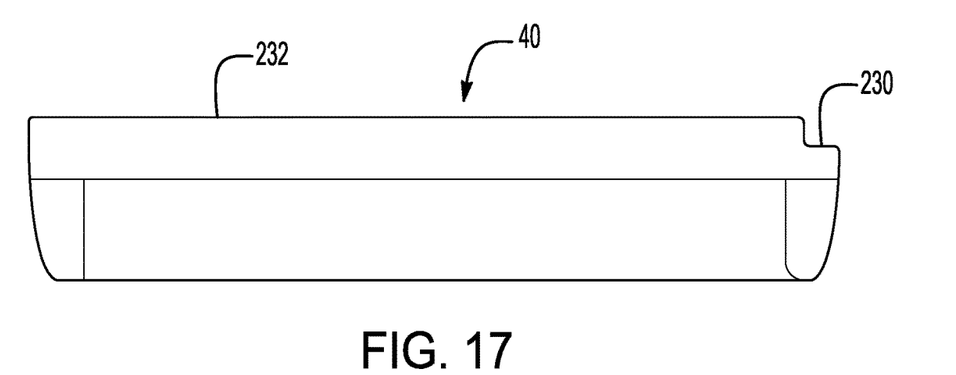
FIG. 17 is a first side view of the insert member of FIG. 12.
Figure 18:
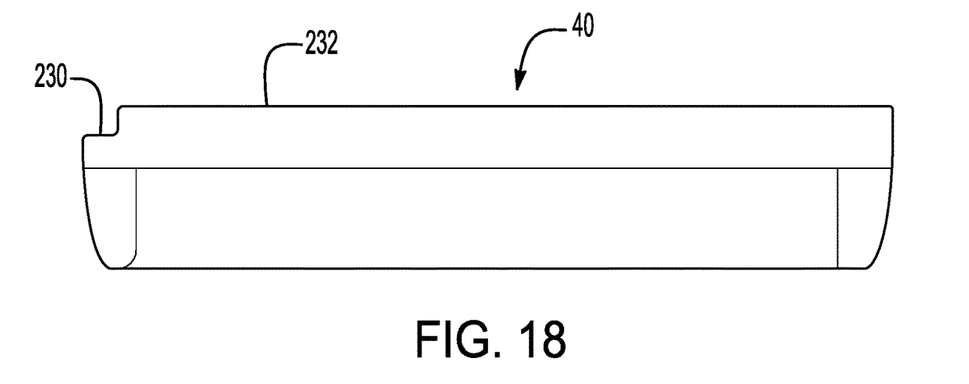
FIG. 18 is a second side view of the insert member of FIG. 12.
Figure 23:
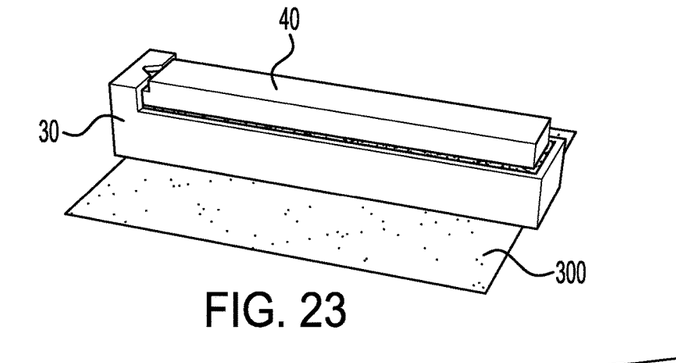
FIG. 23 is a schematic of the frame member disposed on the seaweed sheet with the insert member being at a first operational position relative to the frame member for forming a groove in a first portion of rice.

Referring to FIGS. 1, 13 and 23, when the insert member 40 is in a first operational position relative to the frame member 30, the ledge portion 230 is removably received in the ledge capturing portion 66 such that the keel portion 202 extends into the open region 70 of the frame member 30. Alternately, referring to FIGS. 1, 13 and 28, when the insert member 40 is in the second operational position relative to the frame member 30, the plate portion 200 is disposed in the open region 70.

Referring to FIGS. 1, 13 and 19-33, a flowchart of a method for making a sushi roll 22 utilizing the sushi maker kit 20 in accordance with another exemplary embodiment will be explained.

Figure 32:
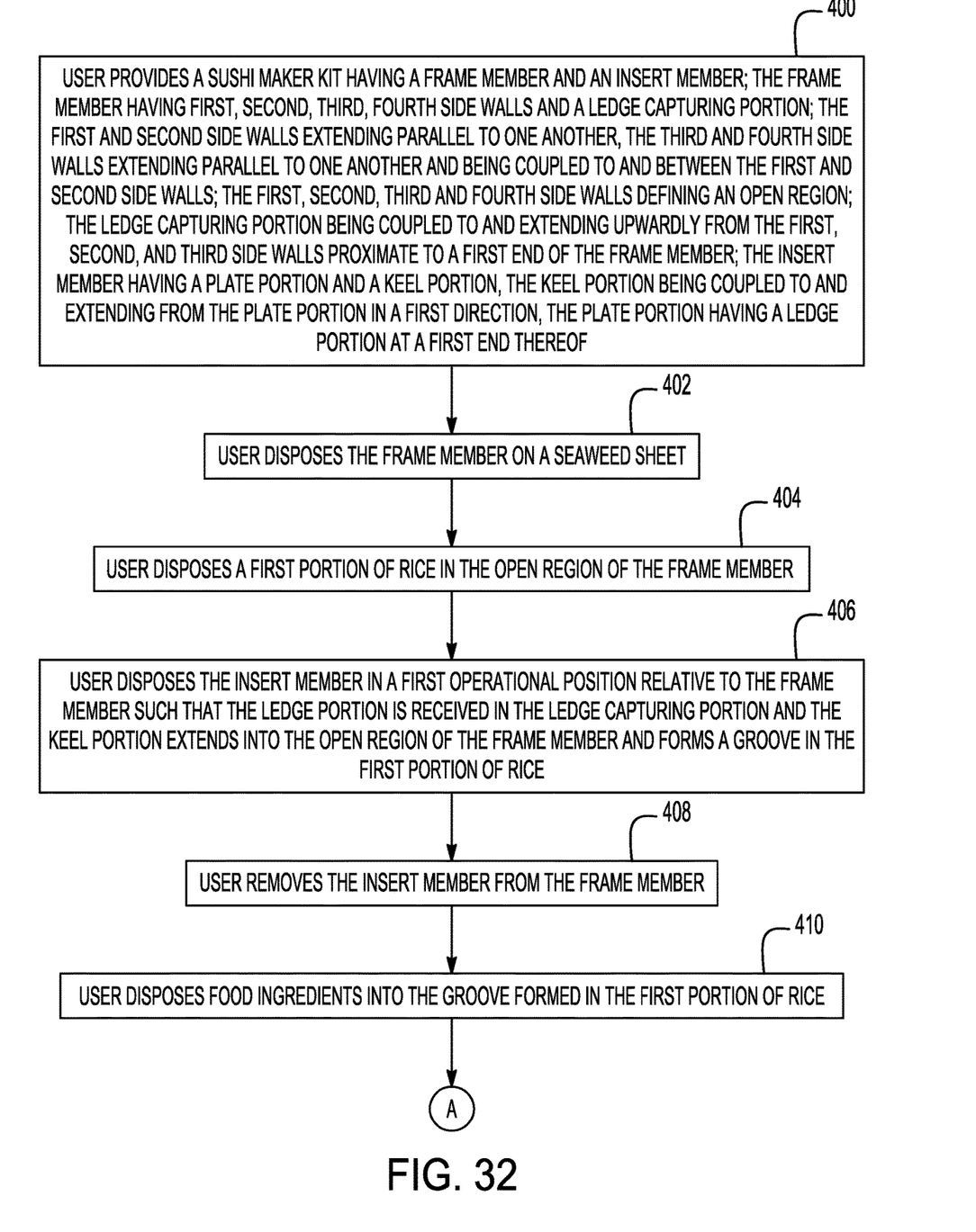
FIGS. 32-33 are flowcharts of a method for making a sushi roll in accordance with another exemplary embodiment.
Figure 33:
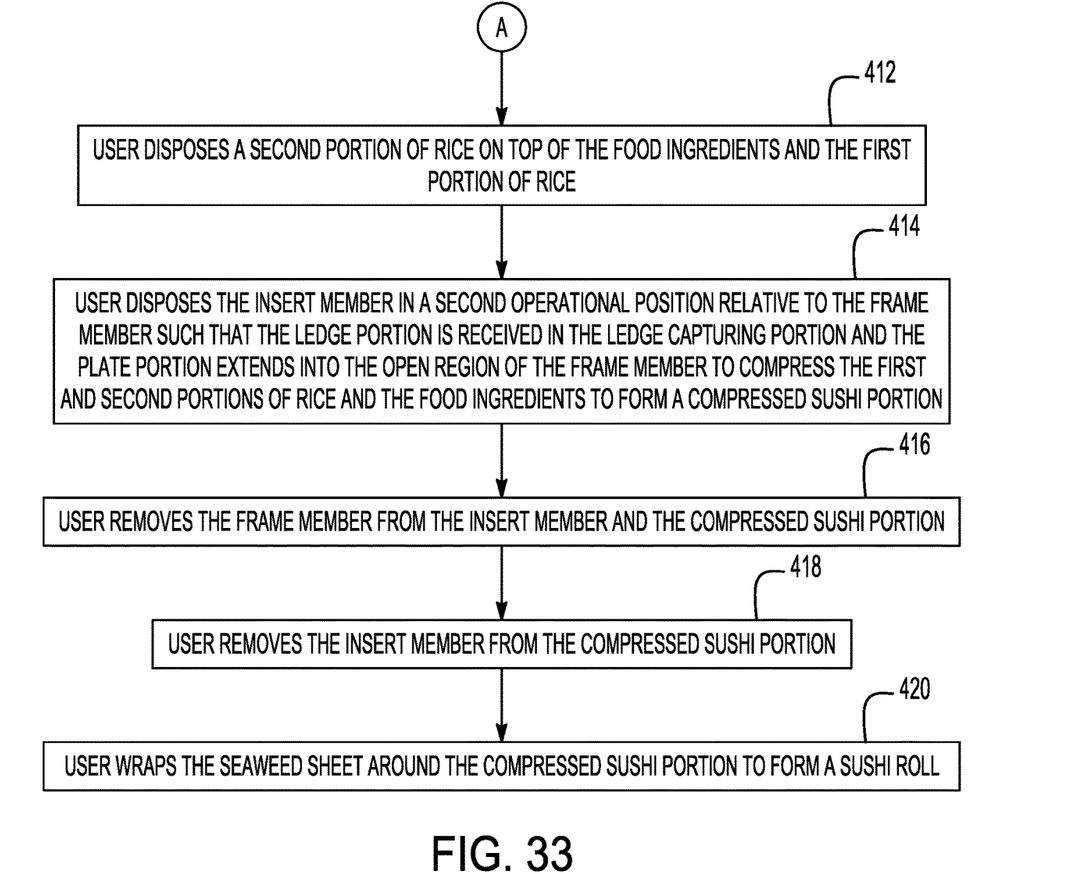

At step 400, a user provides a sushi maker kit 20 having a frame member 30 and an insert member 40. The frame member 30 has first, second, third, fourth side walls 61, 62, 63, 64 and a ledge capturing portion 66. The first and second side walls 61, 62 extend parallel to one another. The third and fourth side walls 63, 64 extend parallel to one another and are coupled to and between the first and second side walls 61, 62. The first, second, third and fourth side walls 61, 62, 63, 64 define an open region 70. The ledge capturing portion 66 is coupled to and extends upwardly from the first, second, and third side walls 61, 62, 63 proximate to a first end 81 of the frame member 30. The insert member 40 has a plate portion 200 and a keel portion 202. The keel portion 202 is coupled to and extends from the plate portion 200 in a first direction. The plate portion 200 has a ledge portion 230 at a first end 221 thereof.

Figure 19:
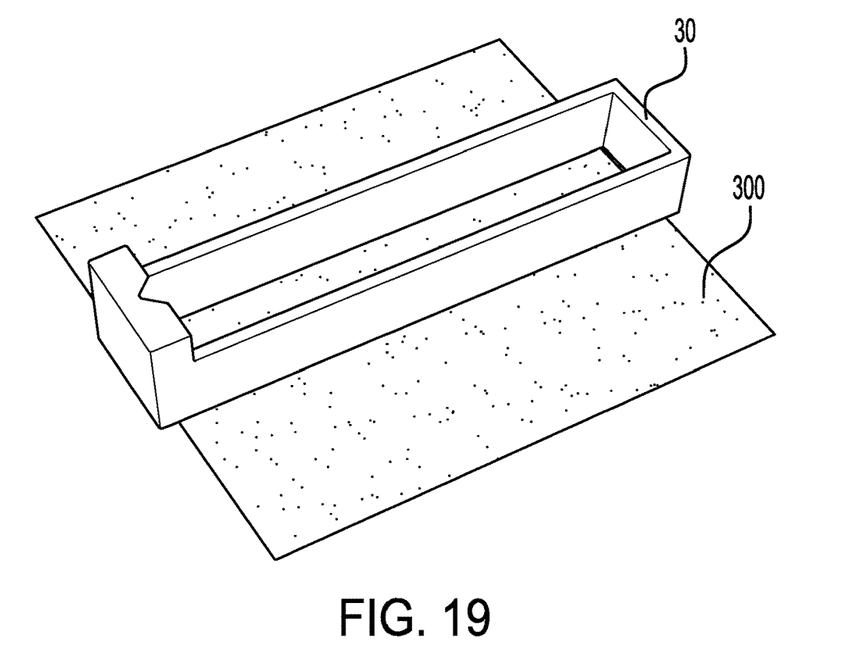
FIG. 19 is a schematic of the frame member disposed on a seaweed sheet.

At step 402, the user disposes the frame member 30 on a seaweed sheet 300 (shown in FIG. 19).

At step 404, the user disposes a first portion of rice 304 (shown in FIG. 20) in the open region 70 of the frame member 30.

At step 406, the user disposes the insert member 40 in a first operational position (shown in FIG. 23) relative to the frame member 30 such that the ledge portion 230 is received in the ledge capturing portion 66 and the keel portion 202 extends into the open region 70 of the frame member 30 and forms a groove 310 (shown in FIG. 24) in the first portion of rice 304.

At step 408, the user removes the insert member 40 (shown in FIG. 24) from the frame member 30.

At step 410, the user disposes food ingredients 320 (shown in FIG. 25) into the groove 310 formed in the first portion of rice 304.

At step 412, the user disposes a second portion of rice 322 (shown in FIG. 26) on top of the food ingredients 320 and the first portion of rice 304.

Figure 29:
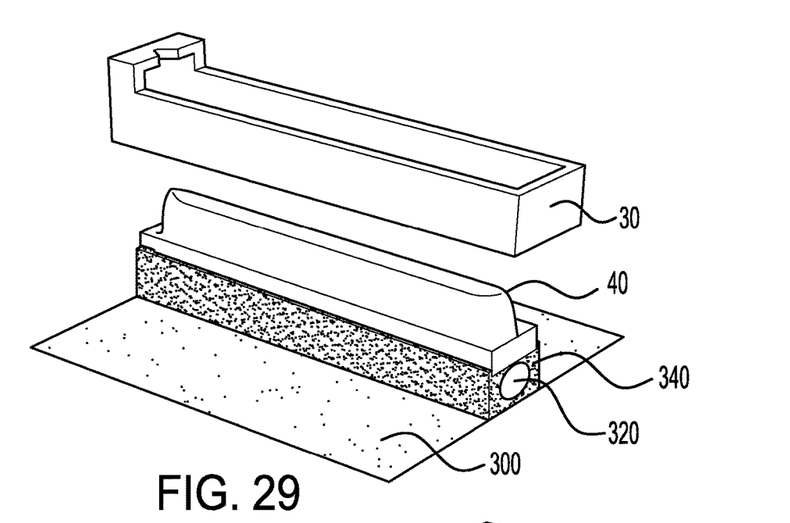
FIG. 29 is a schematic of the frame member being removed from the compressed sushi portion and the insert member.

At step 414, the user disposes the insert member 40 in a second operational position (shown in FIG. 28) relative to the frame member 30 such that the ledge portion 230 is received in the ledge capturing portion 66 and the plate portion 200 extends into the open region 70 of the frame member 30 to compress the first and second portions of rice 304, 322 and the food ingredients 320 to form a compressed sushi portion 340 (shown in FIG. 29).

At step 416, the user removes the frame member 30 (shown in FIG. 29) from the insert member 40 and the compressed sushi portion 340.

At step 418, the user removes the insert member 40 (shown in FIG. 30) from the compressed sushi portion 340.

At step 420, the user wraps the seaweed sheet 300 (shown in FIG. 31) around the compressed sushi portion 340 to form a sushi roll 22.

The sushi maker kit 24 described herein provides substantial advantage over other devices. In particular, the sushi maker kit 24 utilizes the frame member 30 and the insert member 40 to compress rice and food ingredients within the frame member 30 for creating a uniformly shaped sushi roll 22. In particular, the frame member 30 has a ledge capturing portion 66 which is removably captures a ledge portion 230 of the insert member 40. In a first operational position (shown in FIG. 23), the ledge portion 230 is inserted within the ledge capturing portion 66 and the insert member 40 is rotated downwardly form a groove 310 (shown in FIG. 24) in a first portion of rice 304 disposed in the frame member 30. The groove 310 is sized and shaped to allow the user to easily dispose a correct amount of food ingredients 320 (shown in FIG. 25) therein. Further, in a second operational portion (shown in FIG. 26), the insert member 40 is flipped upside down and the ledge portion 230 is inserted within the ledge capturing portion 66 and the insert member 40 is rotated such that a flat top surface 232 compresses a second portion of rice 322 (shown in FIG. 25) over the first portion of rice 304 and the food ingredients 320 to form a compressed seaweed portion 340 (shown in FIG. 30).

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A sushi maker kit, comprising:
an insert member having a plate portion and a keel portion, the keel portion being couple to and extending from the plate portion in a first direction, the plate portion having a ledge portion at a first end thereof;
a frame member having first, second, third, fourth side walls and a ledge capturing portion; the first and second side walls extending parallel to one another, the third and fourth side walls extending parallel to one another and being coupled to and between the first and second side walls; the first, second, third and fourth side walls defining an open region; the ledge capturing portion being coupled to and extending upwardly from the first, second, and third side walls proximate to a first end of the frame member, the ledge capturing portion having first, second, third and fourth wall portions; the first wall portion being coupled to and extending upwardly from the first side wall, the second wall portion being coupled to and extending upwardly from the second side wall, the third wall portion being coupled to and extending upwardly from the third side wall, the fourth wall portion being coupled to the first, second, and third wall portions and extending toward the fourth side wall, the fourth wall portion having a groove extending therein sized and shaped to receive a tip portion of the keel portion of the insert member therethrough;
the ledge portion of the plate portion of the insert member being removably received in the ledge capturing portion such that the keel portion extends into the open region of the frame member when the insert member is in a first operational position relative to the frame member; and
the tip portion of the keel portion of the insert member being received through the groove of the fourth wall portion when the insert member is in a second operational position relative to the frame member.

2. The sushi maker kit of claim 1, wherein:
a vertical distance from a bottom surface of the fourth wall portion to a bottom surface of the third side wall is greater than a vertical thickness of the insert member.

3. The sushi maker kit of claim 1, wherein:
the plate portion of the insert member is disposed in the open region when the insert member is in the second operational position relative to the frame member.

4. The sushi maker kit of claim 1, wherein:
the plate portion of the insert member having a flat top surface.

5. The sushi maker kit of claim 4, wherein:
the plate portion having a groove extending from the flat top surface of the plate portion into the plate portion that defines a top surface of the ledge portion.

6. The sushi maker kit of claim 1, wherein:
a longitudinal length of the keel portion of the insert member is equal to a longitudinal length of the plate portion of the insert member.

7. The sushi maker kit of claim 1, wherein:
a vertical height of the keel portion of the insert member is greater than a vertical height of the plate portion of the insert member.

8. A method for making a sushi roll, comprising:
providing a sushi maker kit having a frame member and an insert member; the insert member having a plate portion and a keel portion, the keel portion being coupled to and extending from the plate portion in a first direction, the plate portion having a ledge portion at a first end thereof; the frame member having first, second, third, fourth side walls and a ledge capturing portion; the first and second side walls extending parallel to one another, the third and fourth side walls extending parallel to one another and being coupled to and between the first and second side walls; the first, second, third and fourth side walls defining an open region; the ledge capturing portion being coupled to and extending upwardly from the first, second, and third side walls proximate to a first end of the frame member; the ledge capturing portion having first, second, third and fourth wall portions; the first wall portion being coupled to and extending upwardly from the first side wall, the second wall portion being coupled to and extending upwardly from the second side wall, the third wall portion being coupled to and extending upwardly from the third side wall, the fourth wall portion being coupled to the first, second, and third wall portions and extending toward the fourth side wall, the fourth wall portion having a groove extending therein sized and shaped to receive a top portion of the keel portion of the insert member therethrough;

disposing a first portion of rice in the open region of the frame member;
disposing the insert member in a first operational position relative to the frame member such that the ledge portion is received in the ledge capturing portion and the keel portion extends into the open region of the frame member and forms a groove in the first portion of rice;
removing the insert member from the frame member;
disposing food ingredients into the groove formed in the first portion of rice;
disposing a second portion of rice on top of the food ingredients and the first portion of rice;
disposing the insert member in a second operational position relative to the frame member such that the tip portion of the keel portion of the insert member is received through the groove of the fourth wall portion of the ledge capturing portion and the plate portion extends into the open region of the frame member to compress the first and second portions of rice and the food ingredients to form a compressed sushi portion; and
removing the frame member and the insert member from the compressed sushi portion.

9. The method of claim 8, further comprising:
wrapping a seaweed sheet around the compressed sushi portion to form the sushi roll.

10. The method of claim 8, wherein:
a vertical distance from a bottom surface of the fourth wall portion to a bottom surface of the third side wall is greater than a vertical thickness of the insert member.

* * * * *